July 6, 1971    F. A. WINTERHALTER ET AL    3,591,580
FILTER CONSTRUCTION FOR A FLUID-SOLID SEPARATION
Filed Jan. 17, 1969
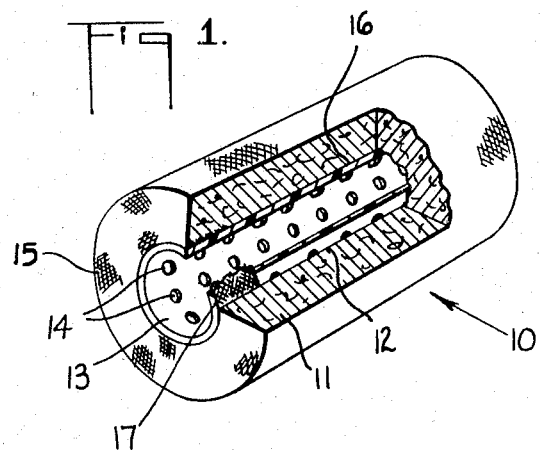
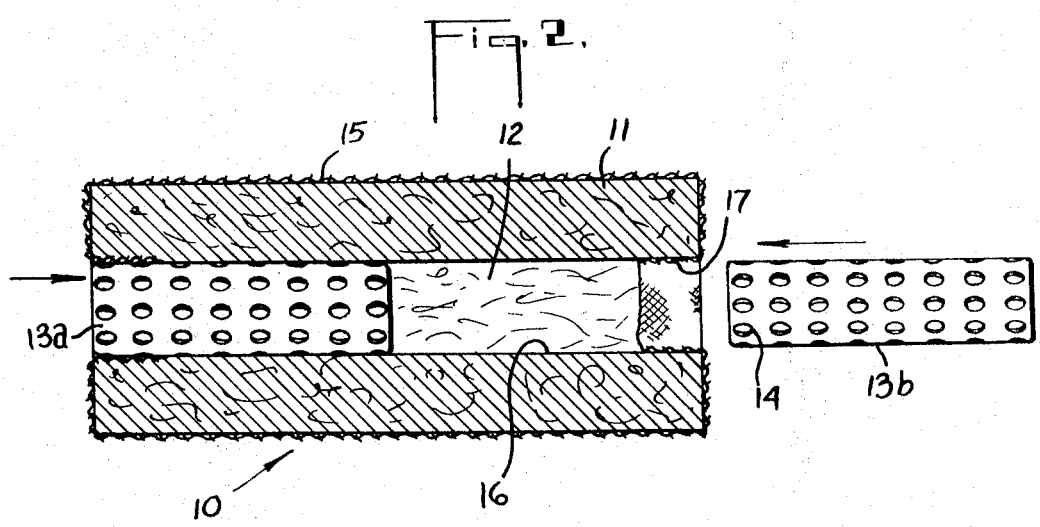
INVENTORS
FRANK ARTHUR WINTERHALTER
RONALD BUXTON RAAB
BY
John A. McKinney
ATTORNEY United States Patent Office 3,591,580
Patented July 6, 1971

3,591,580
FILTER CONSTRUCTION FOR A FLUID-SOLID SEPARATION
Frank Arthur Winterhalter, Toledo, and Ronald Buxton Raab, Perrysburg, Ohio, assignors to Johns-Manville Corporation, New York, N.Y.
Filed Jan. 17, 1969, Ser. No. 792,005
Int. Cl. B01d 27/00
U.S. Cl. 210—232                                    8 Claims

ABSTRACT OF THE DISCLOSURE

Fluid-solid separating filter construction for a filtering medium having an internal channel for fluid influence and/or effluence and a reinforcing tube for the channel of the filtering medium which is hollow and perforated to distribute or collect and conduct the influent or effluent to or from the filtering medium, wherein the channel of the filtering medium and the reinforcing tube are cooperatively arranged to provide a press grip therebetween and thus securely fix the intermediately inserted ends of a protective retaining covering enveloping the filtering medium to hold the same in position.

BACKGROUND OF THE INVENTION

This invention is concerned with an improved filter construction for fluid-solid separation. Frequently, the composition of a liquid to be filtered, or a contaminant to be removed therefrom, is of a nature which attacks or deteriorates the filtering medium or components thereof diminishing their physical integrities to the point whereby the medium loses its consistency and succumbs to disintegration in use, or in particular in handling in connection with its removal from the system following contamination or exhaustion. Although filter unit disintegration pursuant to removal is not as serious as during operation since the system is at that time usually closed, it prolongs the downtime of the change over and increases labor cost in cleanup and may extend the period of exposure of personnel to noxious materials.

To offset such disadvantageous effects, it has therefore been proposed to enclose the vulnerable filtering medium within an enveloping covering to contain the medium or components against disintegration throughout both the filtering operation and handling during subsequent removal, with typical means therefor comprising cloth-like enclosures of very open, porous construction so as not to inhibit the flow and the filtering operation.

SUMMARY OF THE INVENTION

This invention comprises a novel combination and arrangement of components which by virtue of their combined arrangement cooperate together to provide a filter construction of improved utility with a minimum of components and service attention. Briefly, the basic components of the filter—the hollow cylindrical filtering medium and the internal channel reinforcing tube therefor—are designed and arranged to by themselves fix the enveloping filter covering securely in position without additional components.

It is a primary objective of this invention to provide an improved fluid-solid separating filter construction and arrangement which enables a new, more effective use of a protective covering enclosing the filtering medium to prevent fragmentation of the filter medium through deterioration or attack and dispersal of the fragments, without the introduction of additional parts or time consuming service steps.

BRIEF DESCRIPTION OF THE DRAWING

The invention will be more fully understood and further objects and advantages thereof will become apparent when reference is made to the following detailed description of a preferred embodiment of the invention and the accompanying drawings, in which:

FIG. 1 comprises a pictorial perspective view of the filter unit construction of this invention with part broken away to show the details of the construction; and FIG. 2 comprises a sectional view of a filtering unit of another embodiment of the invention.

DESCRIPTION OF THE PREFERRED EMBODIMENT

This invention is especially concerned with fluid filters composed of glass fibers, which because of their availability in very fine diameter and amenability to forming through intermeshing and/or superimposing into masses with highly uniform, fine and circuitous pores, low cost and generally good resistance to deterioration such as is attributable to mildew or other organisms and attack by many common chemicals, among other reasons, have become popular filter medium materials in many areas of fluid filtration. Typically the glass fibers are bonded, as in many other fields of their application, with an organic resin, preferably thermosetting resin binders such as phenol-formaldehyde or urea-formaldehyde. Although common siliceous glass compositions and/or thermosetting resin exhibit relatively good resistance to chemical attack and/or deterioration, certain liquids or contaminants contained therein, or even very hot water over very long periods of exposure, deteriorate or attack or erode the glass and/or the binder with a resultant loss in consistency and the likelihood of fragmentation.

Although this invention is particularly directed to filter units comprising resin bonded glass fiber filtering media, it is nevertheless likewise applicable to filter media of nonglass components such as cellulosic fiber which is prone to attack by organisms as well as chemicals, and particulate filter materials secured together by nonresinous binders which are also likely to be susceptible to attack.

Referring to the drawings, FIG. 1 illustrates a perspective view, partly broken away to more clearly show the arrangement of components, of a common generally cylindrical-type filter 10, including a hollow cylindrical body 11 comprising the porous filtering medium composed of thermosetting resin bonded, fine intermeshed glass fibers. Cylindrical filter body 11 is provided with a flow channel 12 extending the axial length thereof and terminating with open ends to collect and carry away the filtered effluent, or if the flow is reversed to distribute the influent. Within flow channel 12 is positioned a hollow perforated reinforcing tube-like member 13, of a cross-sectional configuration and dimension to complement the flow channel, having a multiplicity of holes 14 distributed over its surface for the ready passing of fluid. The normal function of the reinforcing member 13 is to brace the highly porous and thus somewhat structurally weak and fragile filtering medium, and to sustain it against erosion from the force of the fluid flow, which may be under substantial pressure.

Enveloping the entire outer surface of the cylindrical body 11 of the filtering medium is protective covering 15, composed of a permeable textile knit sleeve, which is applied so as to continue around each of the ends of the cylindrical filter body 11 and, according to this invention, to extend a short distance into each open terminal end of the flow channel 12, intermediate the reinforcing member 13 and internal wall 16 of hollow cylindrical body 11, as shown by portion 17 comprising the ends of covering 15. The filter body 11 and reinforcing member 13 cooperate to provide a forced press grip about the portion 17 of protective covering 15, securely fixing the same in position about the filter body. With this arrangement the protective covering 15 is effectively held and fixed in position without additional components or means, or costs therefor, and the protective covering 15 retains any fragments or sections of the filtering medium material and/or contaminants filtered out and retained thereon which break away either during filtering, or unit removal and replacement. Moreover, the forced press grip effected by portion 17 of protective covering 17 wedged intermediate the internal wall 16 of channel 12 of filter body 11, and reinforcing member 13, additionally serves to securely hold reinforcing member 13 in location thereby obviating the need for fastening devices or materials such as adhesives, and the added costs and labor connected therewith.

The embodiment of FIG. 1 comprises the single section reinforcement member 13, necessitating tucking the portion 17 of covering 15 into at least one end of the filtering unit 10 between the reinforcing member 13 and the interior wall 16 of the hollow cylindrical body 11 following insertion of the reinforcing member 13 from the other end. To facilitate assembly, however, as shown in FIG. 2 the reinforcing member 13 can be formed in two or more sections such as 13a and 13b. Thus with the multiple section reinforcing member 13a and 13b, following enveloping the filter body 11 with the protective covering 15 and inserting portion 17 thereof into both the respective adjacent end of the fluid channel 12, each section of the reinforcing member 13a and 13b is pushed into the opposite end of flow channel 12, as indicated by the arrows, which action itself effects the forced press grip securing the protective covering 15 into operating position.

As pointed out hereinbefore, although this invention is primarily concerned with the now common units employing filtering media of resin bonded glass fiber, since the invention is primarily concerned with a physical arrangement of components and clearly has application to units comprising filtering media of other compositions, it is not to be limited to the materials of the preferred embodiment. Also, the protective covering 15 may be composed of other than knit-type cloths but preferably materials having a substantial degree of stretch or resiliency to provide a close sag and wrinkle free fit, as well as high permeability to enable unrestricted flow therethrough. The protective covering may be formed of substantially any relatively open textile-type of material such as cotton, nylon, Dynel.

We claim:
1. A filter construction for fluid-solid separation, comprising the combination of:
 (a) means providing a porous body for the separation and retention of solids from fluids comprising a filter medium of cylindrical tube-like configuration having a flow channel extending transversely therethrough the axially length thereof and terminating with open ends;
 (b) means providing perforated reinforcing member positioned within said channel composed of multiple stations and being of substantially the same cross-sectional configuration as said channel at least at each terminal end thereof;
 (c) means providing a permeable and flexible covering enveloping the outer surface of the porous body comprising the filtering medium to contain the material thereof, and extending within the said channel ends intermediate the filter medium and the reinforcing member positioned therein; and, said hollow perforated reinforcing member positioned within the channel of the porous body comprising the filter medium being composed of multiple sections to enable assembly of the components by insertion of a section thereof into each end of the channel whereupon said channel and said multiple reinforcing members cooperate to provide a press grip for the portion of the covering intermediate thereof to securely fix the covering about the filtering medium and whereby said multiple sections of the hollow perforated reinforcing member facilitates forming of the press grip securing the covering between the reinforcing member and the porous body.

2. The filter construction of claim 1, wherein the porous body comprising the filtering medium comprises mineral fibers.

3. The filter construction of claim 2, wherein the mineral fibers comprising the porous body of the filtering medium are glass fibers.

4. Filter construction of claim 3, wherein the glass fibers comprising the porous body of the filtering medium are bonded with organic resin.

5. The filter construction of claim 4, wherein the bonded glass fibers, comprising the porous body of the filter medium are bonded with thermosetting resin.

6. The filter construction of claim 5, wherein the protective covering is cloth.

7. The filter construction of claim 6, wherein the cloth covering is a knit tubular cloth.

8. The filter construction of claim 7, wherein the knit tubular cloth comprising the protective covering is of knit cotton.

References Cited

UNITED STATES PATENTS 2,946,449  7/1960  Shaw _____ 210—484
3,064,820  11/1962  Gillick, Jr. et al. ____ 210—484X JOHN ADEE, Primary Examiner U.S. Cl. X.R.

210—484, 489